United States Patent
Pourmand

[19]

[11] Patent Number: 5,918,998
[45] Date of Patent: Jul. 6, 1999

[54] JOINT FOR THREE-DIMENSIONAL FRAMED STRUCTURES FOR INTERIOR AND CONSTRUCTION USE

[76] Inventor: Tooraj Pourmand, 46 Firwood Rd., Port Washington, N.Y. 11050

[21] Appl. No.: 08/733,428

[22] Filed: Oct. 18, 1996

[51] Int. Cl.[6] .................................................. F16B 1/00
[52] U.S. Cl. ......................... 403/218; 403/403; 403/171; 403/169; 52/655.1
[58] Field of Search .................................. 403/217, 218, 403/219, 178, 176, 175, 174, 171, 170, 169, 205, 403; 52/655.1

[56] References Cited

U.S. PATENT DOCUMENTS

| | | | |
|---|---|---|---|
| 1,364,821 | 1/1921 | Trexler | 403/219 |
| 2,208,227 | 7/1940 | Page | 403/219 X |
| 2,904,360 | 9/1959 | Gamlen | 312/140 X |
| 3,144,265 | 8/1964 | Humble | 403/219 |
| 4,078,847 | 3/1978 | Presnick | 312/111 X |
| 4,127,759 | 11/1978 | Orbom | 52/655.1 X |
| 4,145,149 | 3/1979 | Ruga | 403/217 |
| 4,247,218 | 1/1981 | Jeanin . | |
| 4,355,918 | 10/1982 | Van Vleit . | |
| 4,464,073 | 8/1984 | Cherry . | |
| 4,498,800 | 2/1985 | Sielaff | 403/172 |
| 4,511,278 | 4/1985 | Robinson . | |
| 4,569,165 | 2/1986 | Baker et al. . | |
| 4,671,693 | 6/1987 | Rossman . | |
| 5,516,225 | 5/1996 | Kvols | 403/170 |

FOREIGN PATENT DOCUMENTS

| | | | |
|---|---|---|---|
| 60228 | 10/1954 | France | 403/217 |

*Primary Examiner*—Anthony Knight
*Assistant Examiner*—William L. Miller

[57] ABSTRACT

A joint for use in forming a three-dimensional framed spatial structure for interior use and construction comprising three identical shaped surfaces or wings resembling the corner of a cube, each of the three identical shaped surfaces (4, 5 & 6) comprised of two different segments: the first an L-shaped segment with one hole at the intersection (23) and two holes on each arm of the "L" (26 & 27); the second segment comprising a sector of a circle whose arc measures ninety degrees (4) with a hole in the center (32) to permit attachments. These two different segments are connected on the inside surface (surface A) by a forty-five degree angle and on the outside (surface B) by a ninety-degree angle. Multiple connections and attachments can be made through the four predetermined holes (23, 26, 27, 32) located on each of the three identical shaped surfaces (4, 5, 6). The three identical shaped surfaces are connected by three identical forty-five degree angled surfaces (13, 14, 15) which permit said joint to rest on a surface at a forty-five degree angle from the surface or to be attached to other units at a forty-five degree angle; a fourth smaller angled triangular surface (22) with a hole in the center (43) is located at the point where the three identical shaped surfaces (4, 5, 6) intersect and permits the joint to rest on an angled surface, or alternatively, to interconnect with the angled surface of other similar joints through the hole (43) located in the center of the angled surface (22).

5 Claims, 8 Drawing Sheets

JOINT FOR THREE-DIMENSIONAL FRAMED STRUCTURES FOR INTERIOR AND CONSTRUCTION USE

BACKGROUND OF THE INVENTION

| | | | |
|---|---|---|---|
| 4,247,218 | 1/1981 | Beausejour | 7/829 |
| 4,145,149 | 3/1979 | Ruga | 863/718 |
| 4,569,165 | 2/1986 | Baker | 563/631 |
| 4,464,073 | 7/1984 | Cherry | 439/286 |
| 4,355,918 | 10/1982 | Vanvieet | 210/357 |
| 4,671,693 | 6/1987 | Rossman | 703/410 |
| 4,511,278 | 4/1985 | Robinson | 471/283 |
| 4,498,800 | 2/1985 | Sielaff | 449/173 |

The present invention relates in general to three-dimensional framed structures and has specific reference to interior uses (such as showcases, desks, tables, exhibition booths, entertainment centers, etc.) and construction uses (such as roof structures) for the junction device or joint typically used for assembling the component elements of so-called "spatial" framed structures consisting of superposed flat assemblies of longitudinal elements disposed in different planes and oriented in various spatial directions, these last-mentioned elements being usually referred to as "diagonal longitudinal elements."

It is the object of the invention to provide a joint for spatial framed structures of this character which is suitable for use in interior and construction structures and which is simple and therefore economical to manufacture, has minimum dimensions to facilitate the storage and transport thereof, and is also easy to use without resorting to special tools or skilled workers.

Although many types of assembling joints consisting of several component elements to be assembled on the site, or hinged multi-directional assemblies, or drilled or tapped spherical members have already been proposed in the art, there has yet to be use of this type of joint for use in interior and construction structures. Moreover, all these known means are either awkward to assemble on the construction site or require an excessive assembling work on the frame elements, for example by welding, or are more related to mechanics and therefore expensive to manufacture.

It is the essential purpose of this invention to provide a new use for interior and construction structures previously unavailable and to eliminate or at least minimize the shortcomings mentioned by providing a device affording:
a particularly simple and therefore economical manufacture;
easy storage and transport in order to cut costs;
easy assembling and disassembling on the site without resorting to special tools or skilled workers
multiple designs and functions for interior and construction structures, and
flexible use at various angles and shapes.

These various objects are attained according to the present invention by providing an assembling joint for spatial framed structures for interior use and construction which consists of a unitary device comprising three identical shaped surfaces (wings) from which multiple connections and attachments can be made. By assembling up to eight of these joints side by side to form a sphere, it becomes possible to use this joint as a connection on any point of a space frame utilized in interior or construction. The joint is designed such that it allows attachments to be easily made, such as roofs, cabinets, drawers, shelves, lighting, etc.

The various features and advantages of this invention will appear as the following description proceeds with reference to the accompanying drawings illustrating diagrammatically several embodiments of the joint for framed structures according to the invention. Of course, these embodiments are provided by way of example and illustration, not limitation, since the shape, proportions and relative arrangement of the component elements may be varied without departing from the basic principles of the invention.

BRIEF DESCRIPTION OF THE DRAWINGS

FIG. 15A is a perspective view of the end of an angled arm used in the joint shown in FIGS. 1 and 5;

FIG. 15B is a front view of an angled arm used in the joint shown in FIGS. 1 and 5;

FIG. 15C is plain view from above of an angled arm used in the joint shown in FIGS. 1 and 5;

FIG. 15D is a plan view from above of an arm used in the joint shown in FIGS. 1 and 5;

FIG. 15E is a perspective view of an arm used in the joint shown in FIGS. 1 and 5;

FIG. 15F is a front view of an arm used in the joint shown in FIGS. 1 and 5.

DESCRIPTION OF THE PREFERRED EMBODIMENTS

Figure 1:
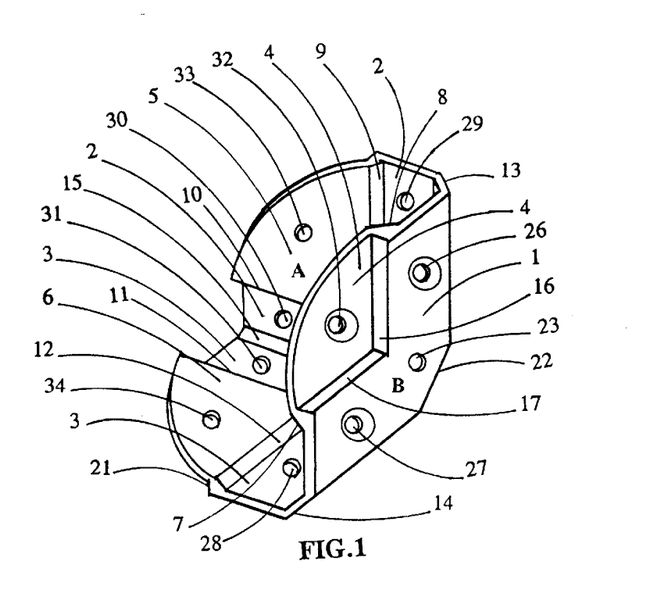
FIG. 1 is a general perspective view of the joint; the joint is similar to the corner of a cube and has three identical shaped surfaces (wings) from which multiple connections and attachments can be made; in between the three identical shaped surfaces are located three identical angled surfaces which permit the joint to rest at or be utilized at forty-five degree angles; a fourth angled surface at the edge of the joint resembling a triangle and having a hole in the center permits the joint to rest on its own edge, or alternatively, to interconnect the edges of other said joints.

In the example illustrated in FIG. 1 the joint according to this invention comprises a unitary device having three identical shaped surfaces or wings resembling the corner of a cube, each of the three identical shaped surfaces comprised of two different segments: the first an L-shaped segment with one hole in the center and two holes on each side; the second segment resembling a sector of a circle whose arc measures ninety degrees with a hole in the center;

The two different segments are separated from the inside by a forty-five degree angle and from the outside by a ninety-degree angle;

Multiple connections and attachments can be made through the four said predetermined holes located on each of the three said identical shaped surfaces;

In between the three identical shaped surfaces are located three identical forty-five degree angled surfaces which permit said joint to rest at forty-five degree angles or to be utilized at forty-five degree angles;

A fourth smaller angled surface resembling a triangle with a hole in the center is located at the point where the three identical shaped surfaces intersect and permits said joint to rest on said angled surface, or alternatively, to interconnect with said angled surface of other said joints through the hole located in the center of said angled surface. By assembling up to eight said joints side by side to form a spherical shape, it becomes possible to utilize said joint on any point of a space frame.

Figure 12:
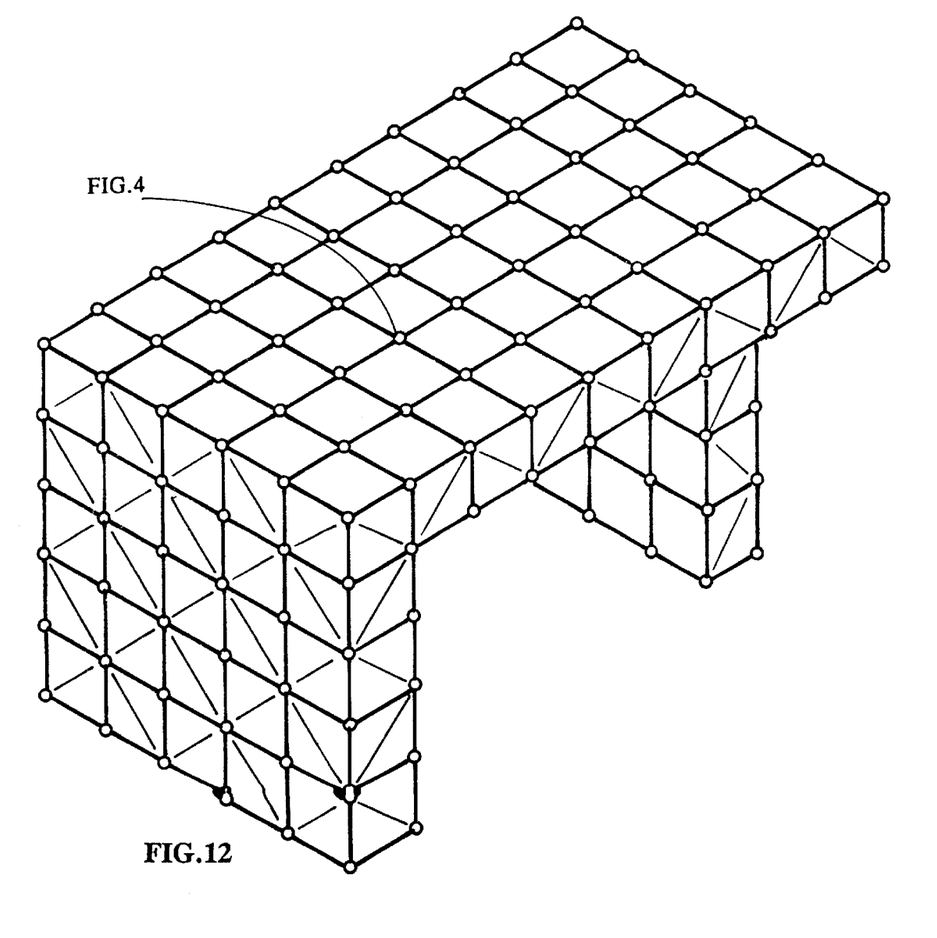
FIG. 12 is a plain view from above showing a sample three-dimensional framed ceiling structure using joints of the type shown in FIG. 1.
Figure 13:
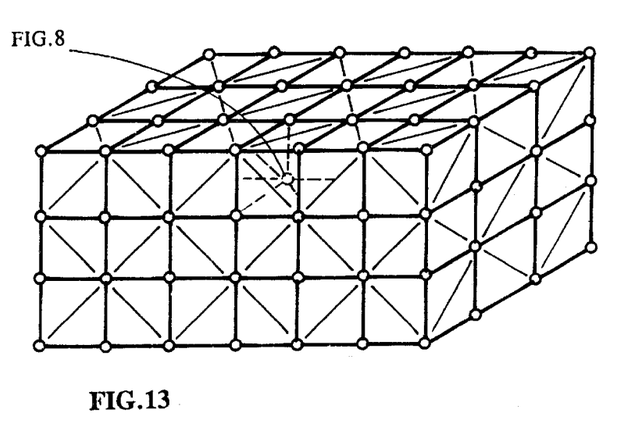
FIG. 13 is view similar to FIG. 12 showing a framed structure constructed by using the joint shown in FIG. 1.

A single said joint can be used for edge connections (FIGS. 9–12); a combination of two said joints can be used for corner connections (FIGS. 9, 10, 12 and 13); a combination of four said joints can be used for surface connections (FIG. 12, 13) and a combination of eight said joints for intermediate connections (FIG. 13); all connections can be made by simple boltage. The connecting points are designed such that various types of arms and cabinets, drawers, and shelves and surfaces can be easily secured to them. The one-piece joint may be made from any suitable material, as may the arms.

Thus, by using the one-piece joint described above and illustrated in FIG. 1 it is possible to construct three-dimensional spatial framed structures of all desired configurations. All connections for corners, edges, interior, base, surfaces etc., can be constructed by assembling up to eight of these joints. The resulting spatial frames are aesthetically pleasing so as to be used in interior for the construction of exhibition booths, furniture and ceilings; however, the spatial frames are also strong enough to be used for construction purposes if desired.

Figure 2:
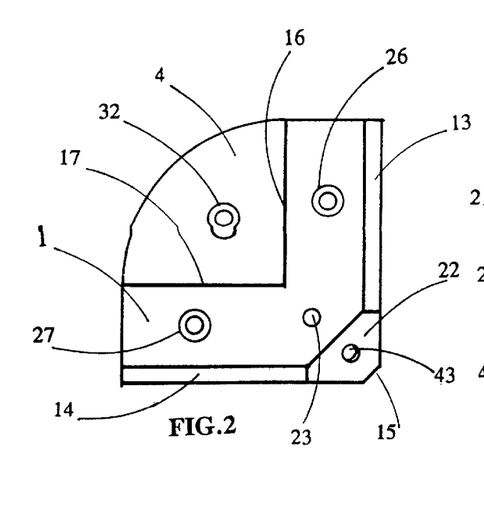
FIG 2 is a side view showing one of the three identical surfaces of the joint shown in FIG. 1.
Figure 3:
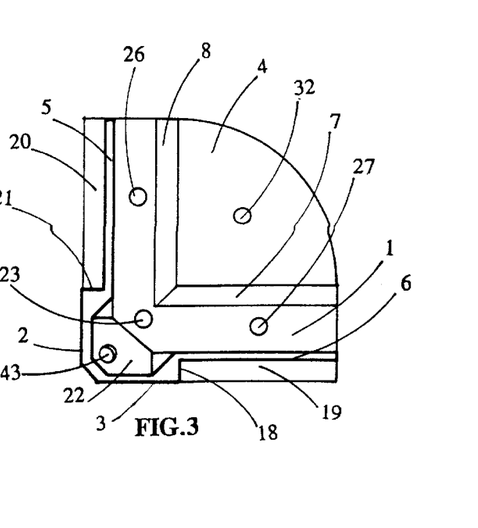
FIG. 3 is an inside view showing one of the three identical surfaces of the joint shown in FIG. 1.

As illustrated in FIGS. 1, 2 and 3 three identical shaped surfaces 1, 2, 3 are used for connection to each other by boltage and for the connection of arms. Also in FIGS. 1, 2, and 3 three other identical surfaces 4, 5, 6 located on three sides of the joint with a hole in the middle of each surface are used for connecting angled arms or braces, holding glass sheets or shelves if the joint is used for the construction of interior showcases, attaching cabinets, doors, shelves, etc. and separating surfaces or attaching covers to them.

In FIGS. 1 and 3 surfaces 7, 8, 9, 10, 11, 12 are constructed at a forty-five degree angle and are located on either side of the connecting arms, thereby providing reinforcement and ease of assembly; the arms can easily be put into place and secured without having to disassemble the joint.

As can be seen in FIGS. 1 and 2 three angled surfaces 13, 14 and 15 provide the following functions: In four unit configurations for surface connections and eight unit configurations for interior connections (FIGS. 4 and 8), these angled surfaces 13, 14, 15 form a channel 47 through which it is possible to suspend a spatial frame from an indoor ceiling, such as in exhibition halls, by a durable cable that can be passed through this channel and secured at the bottom; electric cables can also run through this channel; these channels can be used for hanging signs or adding additional shelves; if the configuration of the space frame is at a forty-five degree angle (FIG. 10) it allows the joint to rest solidly on the floor and any glass sheet or other covering can also be placed on it with ease.

As can be seen in FIGS. 1, 2, 3 the split level indentation or cleft 16,17,18,19,20 21 located in the middle of each of the three identical shaped surfaces provides the following functions: When used in interior, the indentation enables any type of covering over 4, 5, 6) to remain at the same level as the joint; when cabinets or drawers are attached to 4, 5, 6 their outside surfaces remain at the same level as the joint; when the joint is used in the construction of ceilings, the outside cover can be placed between these indentations and be secured in place, allowing the covering to function as bracing; since the covering remains at the same level as the joint's surface, it provides a good foundation for other surface coverings as well.

Figure 11:
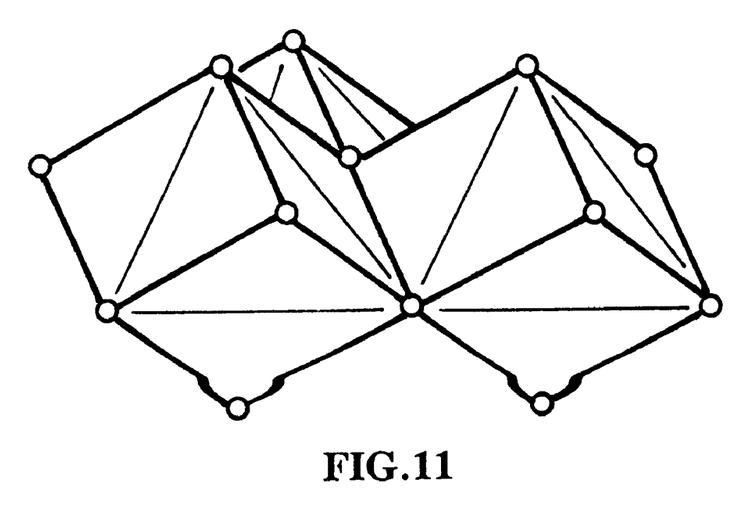
FIG. 11 is a plain view of a sample configuration of a space frame using joints of the type shown in FIG. 1, showing how the corners of said joint can function as resting points for the space frame.
Figure 14:
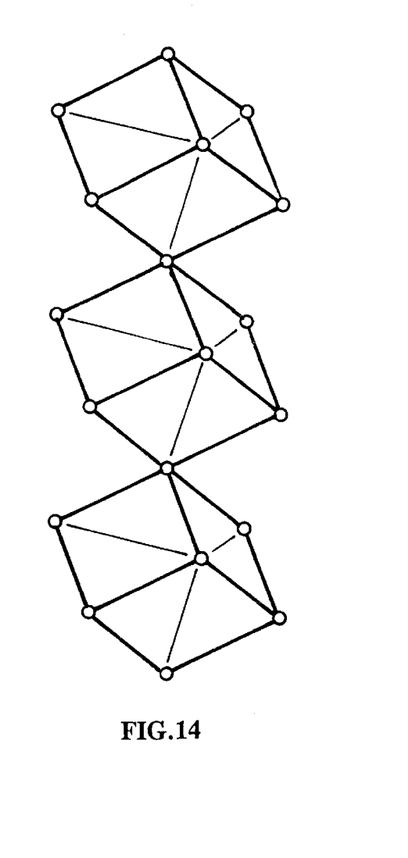
FIG. 14 is a decorative vertical configuration showing how two or more joints of the type shown in FIG. 1 can be connected solely through the edge point of each said joint.

As seen in FIGS. 1, 2 and 3 this single fourth angled surface located at the edge of the joint resembling a triangle 22 with a hole in the middle 43 provides the following functions: As seen in FIGS. 11 and 14, this angled surface allows the space frame to rest on the floor at a special angle on just one edge; moreover, this angled surface allows us to place another cubical frame on top to create a completely new configuration (FIG. 14) and to place any type of covering (such as glass or other desk top) upon this angled surface (FIG. 11); When the joint is resting on this angled surface (FIG. 11), a casting can be attached to the hole in the center of the surface.

Figures 8, 9:
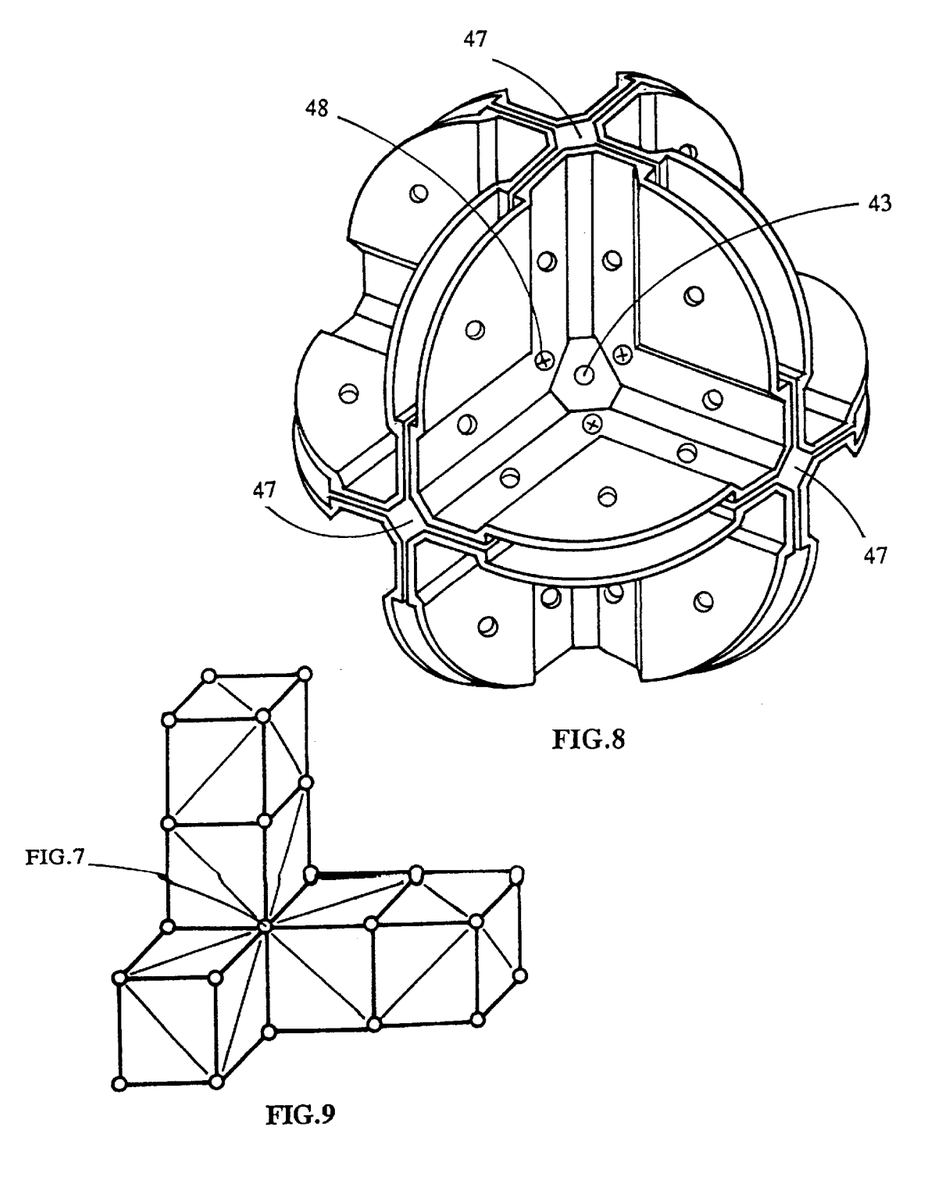
FIG. 8 is a perspective view of a configuration of eight joints of the type shown in FIG. 1.
FIG. 9 is a plain view of a vertical configuration of a sample space frame using joints of the type shown in FIG. 1.
Figure 10:
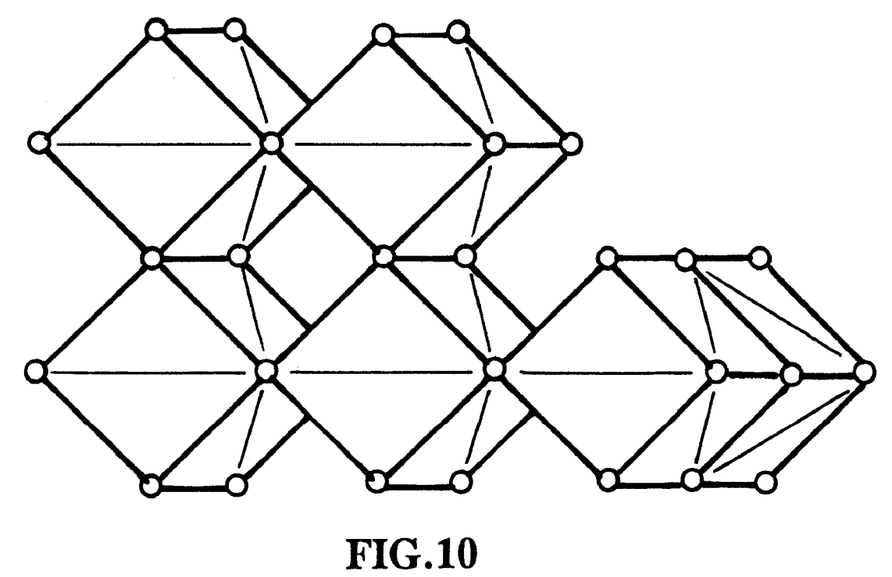
FIG. 10 is a plain view of a forty-five degree angle configuration of a sample space frame using joints of the type shown in FIG. 1.

As illustrated in FIGS. 1, 2, 3, 6 and 7 there are three holes in the smaller joint 23,24,25 and six holes in the larger joint 41, 42 which are used to bolt two joints side by side (FIG. 9).

As illustrated in FIGS. 1, 2, 3, 7 there are six holes in the smaller joint 26, 27, 28, 29, 30, 31 and twelve joints holes in the larger joint 35, 36, 37, 38, 39, 40, 51, 52 which are used to connect and secure the arms.

As illustrated in FIGS. 1, 2, 3, 6 there are three holes in the small joint 32, 33, 34 and six holes in the larger joint 44, 45, 46, 53, 54, 55 which have the following functions: connecting and securing angles arms or bracing; attaching drawers, cabinets, shelves, etc.; to secure covering surfaces.

As seen in FIG. 8 an internal channel 47 created between joints for various purposes (explained in 13, 14, 15).

Figures 6, 7:
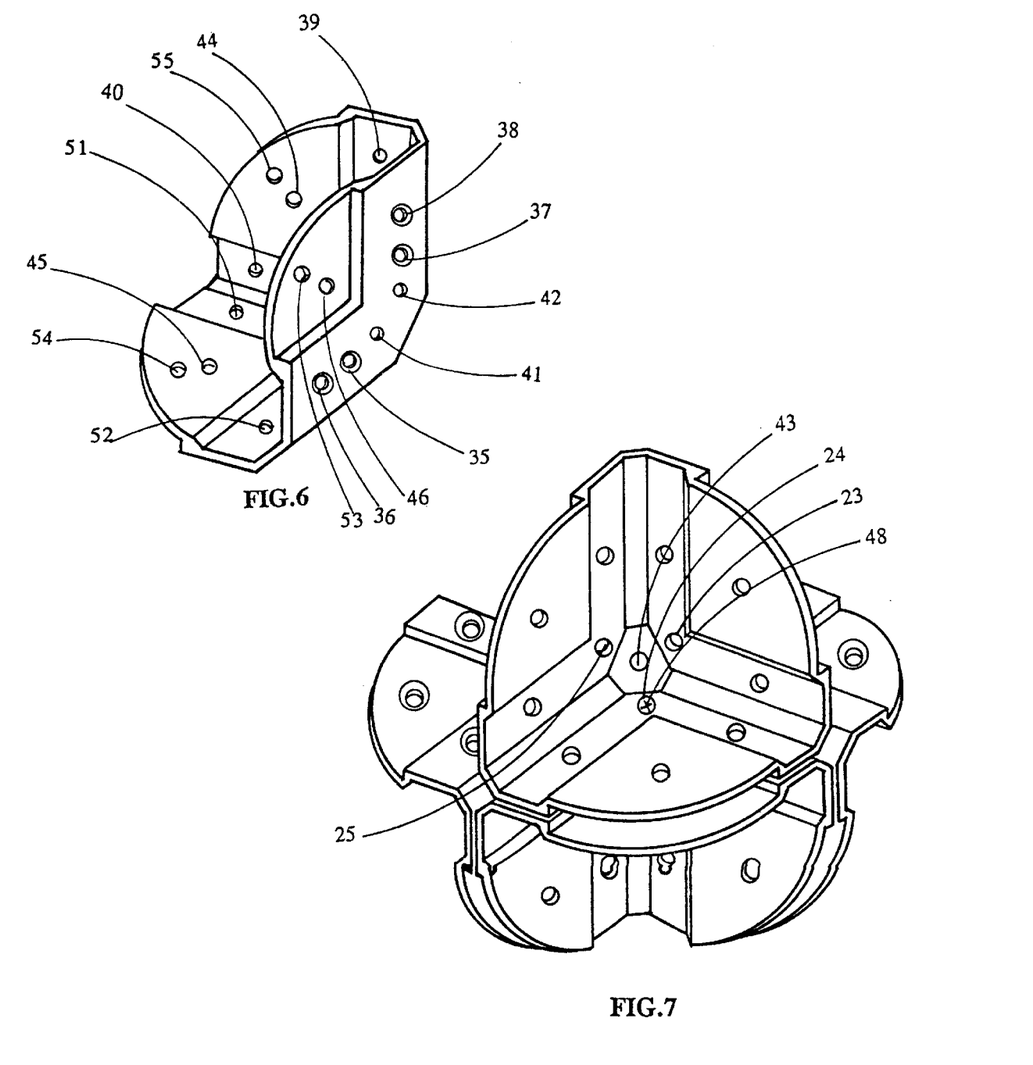
FIG. 6 is a perspective view similar to FIG. 1 but showing a larger sized joint with additional holes on each of the three identical surfaces, thus permitting construction of larger and heavier frames.
FIG. 7 is a perspective view of a configuration of four joints of the type shown in FIG. 1.

As seen in FIGS. 7, 8 nuts and bolts 48.

Figures 4, 5:
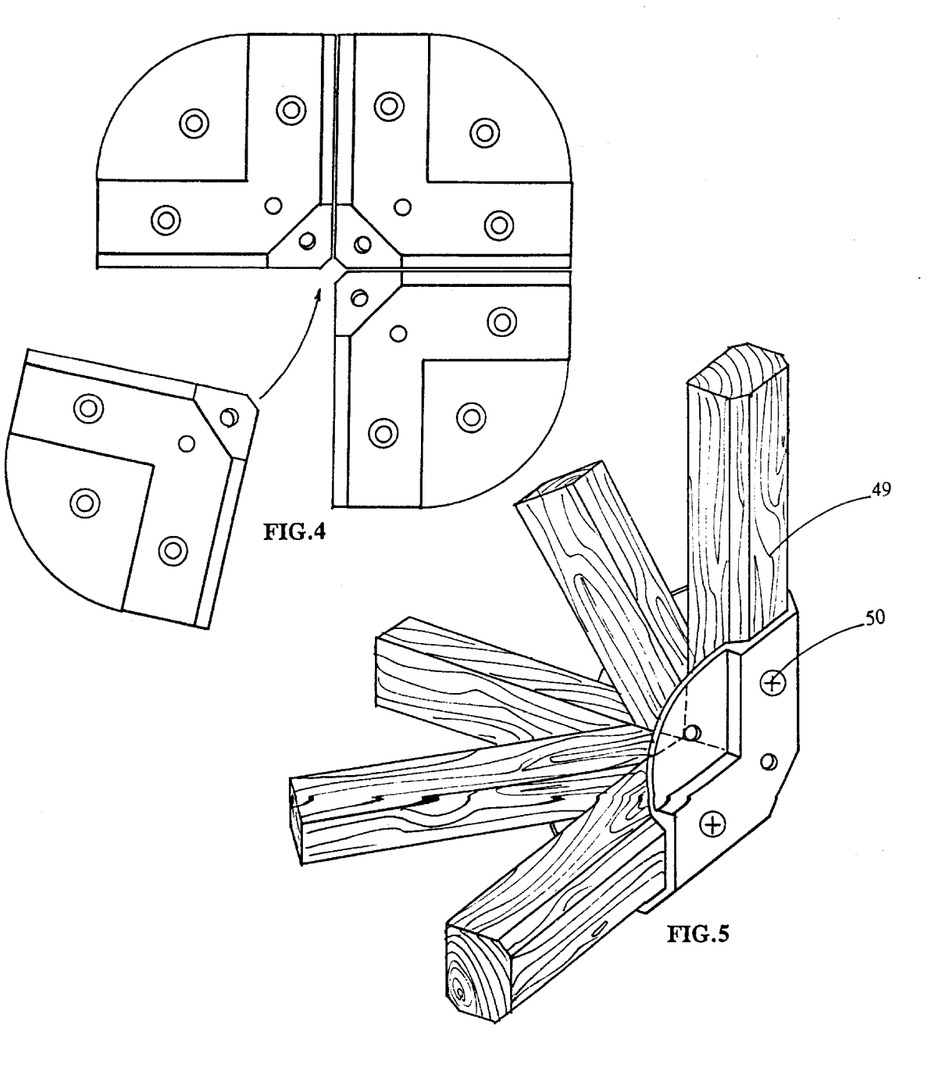
FIG. 4 is a plain view from above showing the connection of four joints of the type shown in FIG. 1.
FIG. 5 is a side view showing the connection of arms to the joint shown in FIG. 1.
Figure 15:
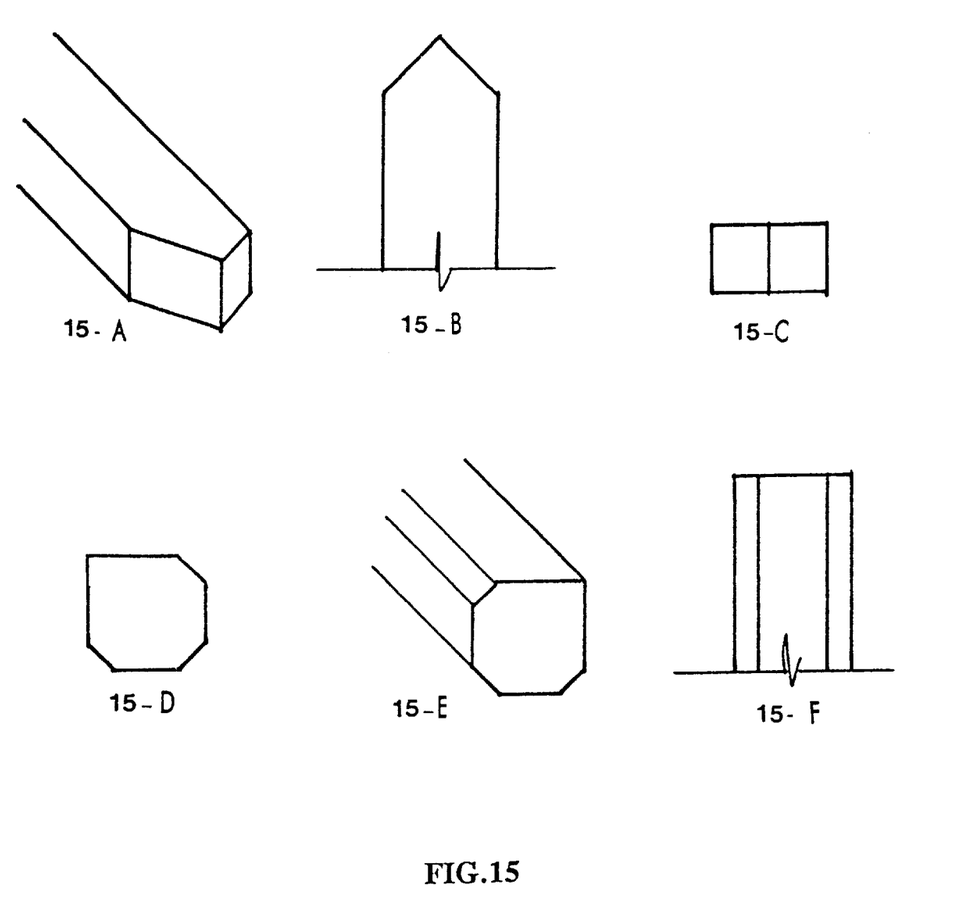
FIG. 15 is an overview of arms and angled arms (braces) used in the joint shown in FIG. 1.

As seen in FIG. 5, 15 arms 49.

As seen in FIG. 5 screws 50.

What is claimed as new is:

1. A joint for use in forming a three-dimensional framed structure for interior use and construction of the type including a plurality of superimposed and parallel spaced planar assemblies, said joint comprising:

three identical shaped surfaces or wings resembling the corner of a cube, each of the three identical shaped surfaces comprised of two different segments: the first an L-shaped segment with one hole at the intersection (23) and two holes on each arm of the "L" (26 & 27); the second segment comprising a sector of a circle whose arc measures ninety degrees (4) with a hole in the center (32);

the two said different segments are connected on the inside surface by a forty-five degree angle and on the outside surface by a ninety-degree angle;

multiple connections and attachments can be made through four predetermined holes (23, 26, 27, 32) located on each of the three said identical shaped surfaces (4, 5, 6);

the three identical shaped surfaces are connected by three identical forty-five degree angled surfaces (13, 14, 15) which permit said joint to rest on a surface at a forty-five degree angle from the surface or to be attached to other units at a forty-five degree angle;

a fourth smaller angled triangular surface (22) with a hole in the center (43) is located at the point where the three identical shaped surfaces intersect and permits said joint to rest on said angled surface, or alternatively, to interconnect with said angled surface of other said joints through the hole located in the center (43) of said angled surface.

2. A joint as claimed in claim 1, wherein assembling together up to eight of said joints permits edge, corner, internal and surface connections and thereby allows for the construction of three dimensional framed structures of all desired configurations by permitting utilization of said joint on any point of a space frame.

3. A joint as claimed in claim 1, wherein the number of total holes is doubled.

4. A joint as claimed in claim 1, wherein the three identical shaped surfaces (4, 5, 6) and the hole (32) located in the middle of each of the three identical shaped surfaces permits attachments for interior needs and construction as well as the securing of those attachments.

5. A joint as claimed in claim 2, wherein a combination of four or eight unit configurations of said joint creates a channel.

* * * * *